United States Patent [19]

Bertin

[11] 4,436,171

[45] Mar. 13, 1984

[54] POWER ASSISTED STEERING DEVICE FOR A VEHICLE

[75] Inventor: Patrice Bertin, Paris, France

[73] Assignee: VALEO, Paris, France

[21] Appl. No.: 351,485

[22] Filed: Feb. 23, 1982

[30] Foreign Application Priority Data

Feb. 23, 1981 [FR] France ................. 81 03512

[51] Int. Cl.$^3$ ............................................ B62D 5/06
[52] U.S. Cl. ........................... 180/148; 74/388 PS; 180/132
[58] Field of Search ............. 180/132, 148; 91/375 A; 74/388 PS; 277/12, 81 P, DIG. 8; 251/214, 312

[56] References Cited

U.S. PATENT DOCUMENTS

| | | | |
|---|---|---|---|
| 3,291,002 | 12/1966 | Folkerts | 91/375 A |
| 4,195,849 | 4/1980 | Taft | 277/12 |
| 4,217,813 | 8/1980 | Bradley | 91/375 A |
| 4,220,072 | 9/1980 | Numazawa et al. | 91/375 A |

FOREIGN PATENT DOCUMENTS 53-111942  9/1978  Japan ............................ 180/132

Primary Examiner—Joseph F. Peters, Jr.
Assistant Examiner—Kenneth R. Rice
Attorney, Agent, or Firm—Young & Thompson

[57] ABSTRACT

A power-assisted steering device for a vehicle. The two parts (13A and 13B) of the steering column have the limited relative angular play permitting an angular offset of the rotor discs (23A, 23B) of the distributor (21). The parts (13A and 13B) are coupled by a torsion bar (52). An annular sealing gasket (70) is engaged in the perforation (50) of at least one of the parts (13A and 13B) round the main portion (53) of the torsion bar (52) and is applied against a widened head (56) of this torsion bar (52). The torsion bar (52) has, between the main portion (53) and the widened head (56), a fillet (57) against which the annular sealing gasket (70, 70') wedges itself. In this way, perfect leak-tightness is provided between the distributor (21) and the outside environment.

6 Claims, 5 Drawing Figures

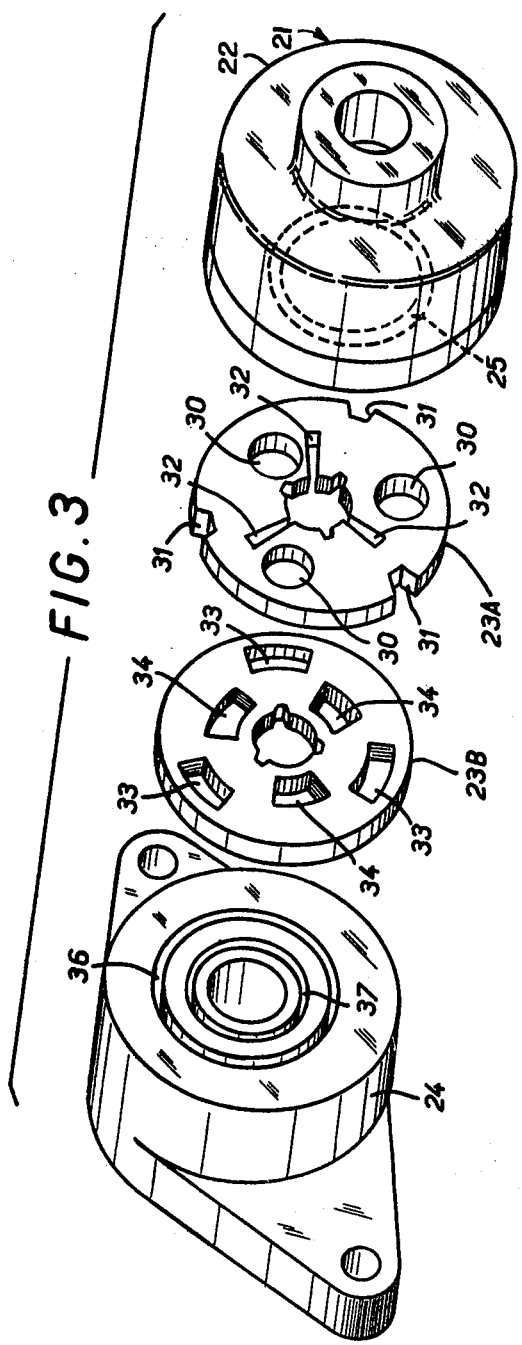
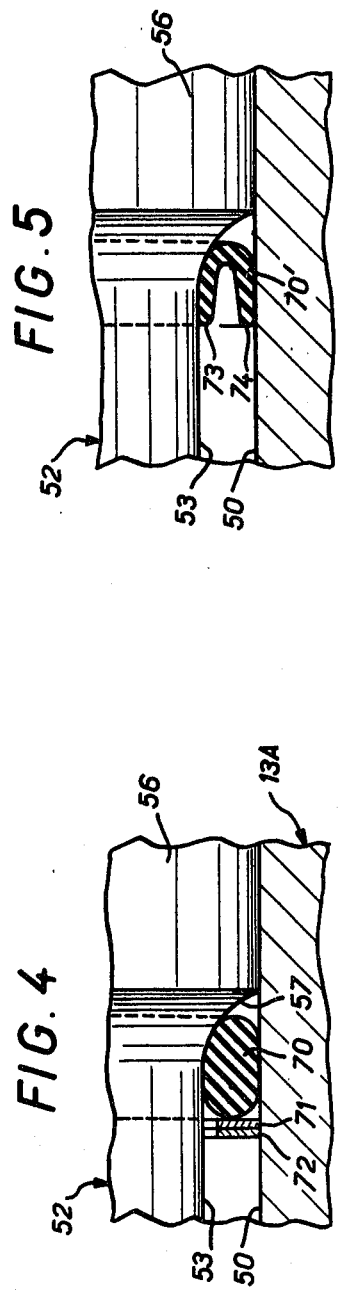

POWER ASSISTED STEERING DEVICE FOR A VEHICLE

The present invention relates to a power-assisted steering device for a vehicle, comprising control means acting on turning means via a rotating transmission element, this element being in two parts coupled elastically by a torsion bar, a relative angular play being provided between these two parts to permit an angular offset between said parts under the action of the control means and against a restoring action of the torsion bar, and power-assistance means which, in response to such an angular offset, are allowed to act on the turning means in the same direction as the control means, said power-assistance means comprising a hydraulic unit, an actuator acting on the turning means and a distributor located between the unit and the actuator and having two rotors which rotate integrally with said two parts respectively.

The torsion bar can be fixed by its ends to the two parts of the rotating transmission element by any suitable means and, for example, sealing means, especially in the form of a brazed joint which certainly has the advantage that it has not only a fixing function, but also a sealing function for the hydraulic fluid between the distributor and the outside environment. Such a brazed joint also has the advantage that it makes it possible conveniently to coincide, on the one hand, the neutral position of the distributor and, on the other hand, the position of rest of the torsion bar.

However, it seemed desirable to envisage a positive fixing, for example by means of a pin, of the ends of the torsion bar to the two parts of the rotating transmission element and, in any case, of the end of this torsion bar associated with the part of the rotating trnsmission element which is associated with the control means, this being in order to increase the safety of manual take-over in the event of failure of the power assistance, even though the angular movement of the parts of the transmission element is limited, thus limiting, by that very fact, the forces transmitted by said pin.

Under these conditions, the invention relates, more particularly, to a power-assisted steering device for a vehicle of the type described above, in which the torsion bar has, on the one hand, a main portion which passes through the distributor and extends freely in a perforation of said parts, and, on the other hand, two ends which are fixed respectively to said parts, at least one of these ends being formed by a widened head of said torsion bar.

Such a widened head conveniently allows fixing by means of a pin with a high degree of safety from a mechanical point of view.

However, such a method of fixing does not ensure leak-tightness to the hydraulic fluid between the distributor and the outside environment. This leak-tightness is generally provided by an additional means consisting of a gasket which is inserted into a groove in the widened head and which interacts with the perforation of the corresponding part. Nevertheless, this groove weakens the cross-section of the widened head and, which is more serious, can cause an incipient break. The groove could, of course, be made not in the widened head, but in the perforation of the corresponding part, but because of the small diameter such a groove is awkward to make.

The subject of the present invention is a power-assisted steering device for a vehicle of the type indicated, which is free of these disadvantages and the construction of which is especially simple and robust, together with excellent leak-tightness.

According to the invention, this device is characterised in that at least one annular sealing gasket is arranged round the main portion of the torsion bar, being applied against the widened head and engaged in the perforation.

By means of this arrangement, the gasket ensures excellent leak-tightness, being automatically pushed against the widened head by the pressure of the hydraulic fluid in the distributor, this pressure being the greater and permitting leak-tightness which is the more effective, the greater the very risk of leakage.

Preferably, the torsion bar has a fillet between the main portion and the widened head. Thus, the annular sealing gasket is designed to wedge itself, applied against the widened head, in this fillet, thus ensuring perfect leak-tightness.

The annular sealing gasket can consist of an O-ring or a lip gasket, but the sealing gasket can also be formed by injecting a polymerisable sealing compound in situ.

This gasket can be provided alone or associated with at least one washer for maintaining axially in position.

Embodiments of the invention are described below by way of example with reference to the attached drawings in which:

FIG. 3 shows this distributor diagrammatically in perspective;

FIG. 4 is a partial view, on an even larger scale, of the sealing gasket applied against a widened head of the torsion bar;

FIG. 5 is a view similar to FIG. 4, but relates to an alternative form.

Figure 1:
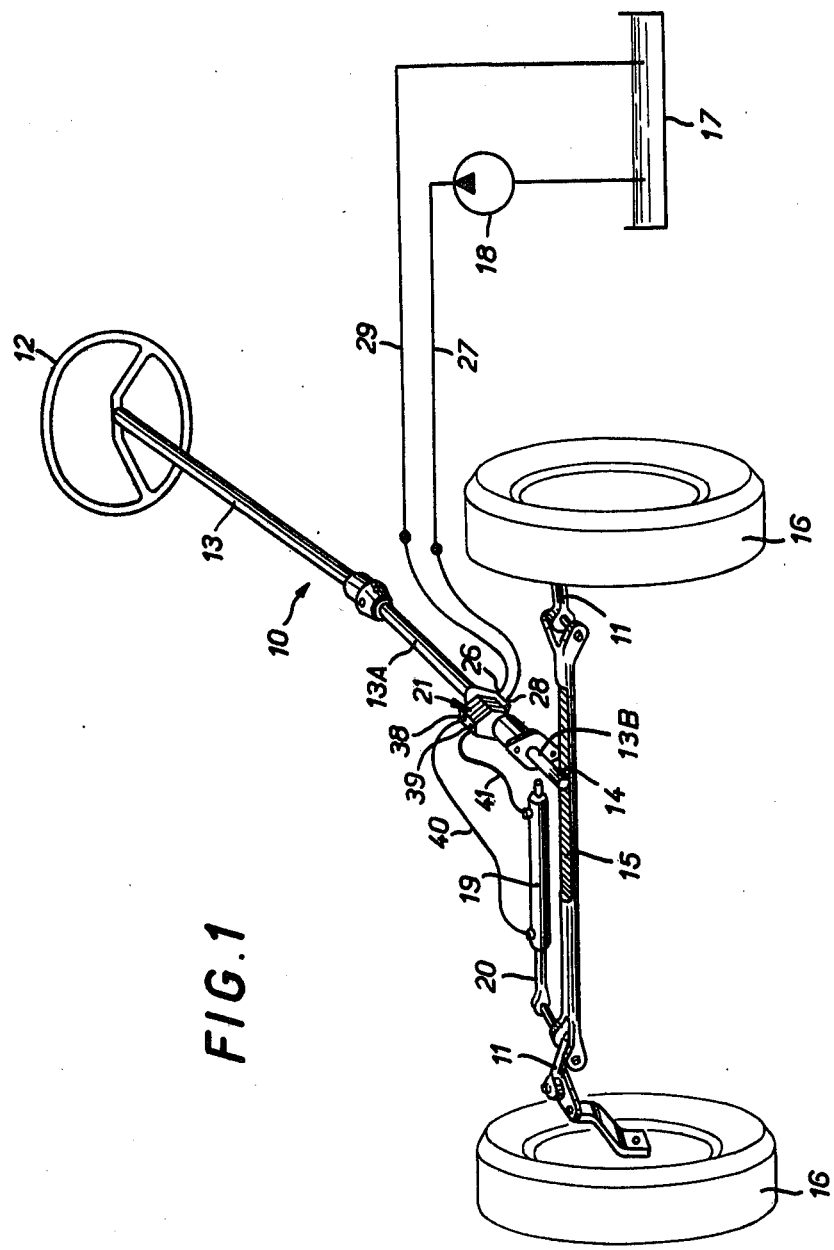
FIG. 1 is a general diagrammatic view in perspective of a power-assisted steering device according to the invention.

In the embodiment illustrated in FIGS. 1 to 4, a power-assisted steering device according to the invention is applied, by way of non-limiting example, to a motor vehicle.

This device comprises (FIG. 1) control means 10 acting on turning means such as rods 11. The control means 10 comprise a steering wheel 12 and a steering column 13. The latter constitutes a rotating transmission element in two aligned parts 13A and 13B coupled to one another with a limited relative angular play permitting an angular offset between the parts 13A and 13B under the action of the control means 10. The part 13A is firmly fixed to the steering wheel 12, whilst the part 13B is firmly fixed to a pinion 14 which meshes with a rack 15. The latter controls the orientation of the front wheels 16 of the vehicle by means of turning rods 11.

A power-assistance hydraulic unit 17, 18 comprises a tank 17 and a pump 18 drawing from this tank 17. An actuator is formed by a hydraulic jack 19, the piston rod 20 of which acts on the rack 15.

A hydraulic distributor 21 is located between the pump 18 and the jack 19 and is sensitive to the angular offset of the two parts 13A and 13B so as to make the jack 19 act on the turning rods 11 in the same direction as the control means 10.

Figure 2:
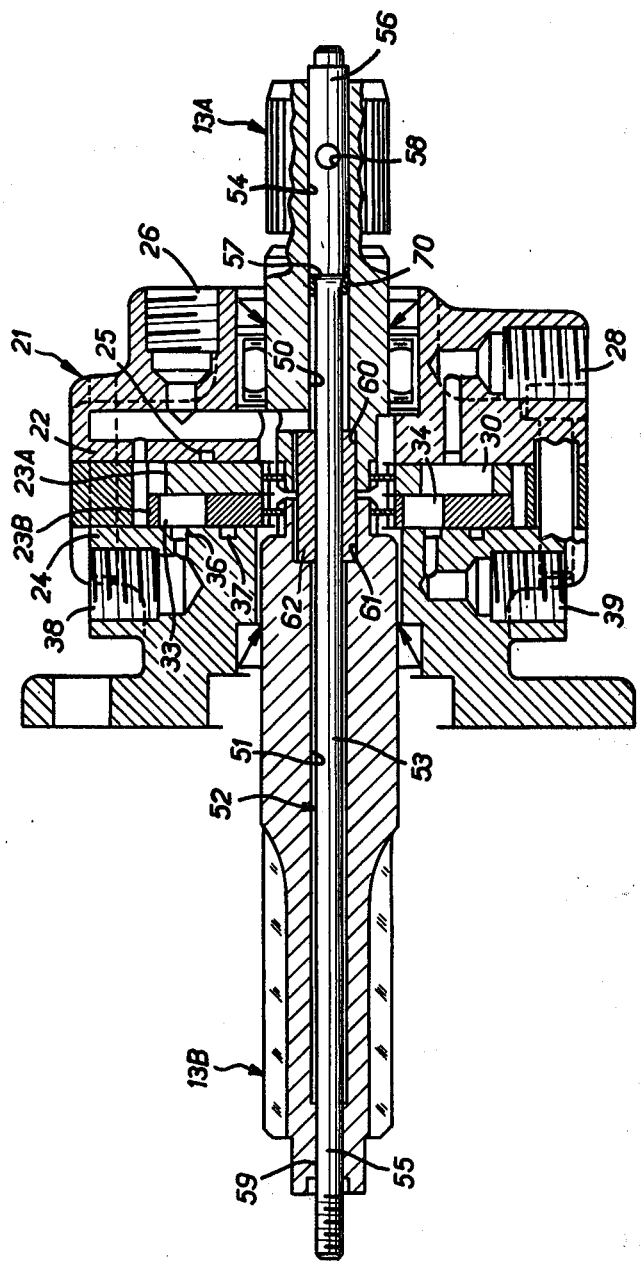
FIG. 2 is a view of the distributor of this device, on a larger scale and in longitudinal section.

In the example illustrated in FIGS. 2 and 3, the distributor 21 comprises an axial stack composed of a first stator 22, a first rotor consisting of a disc 23A rotating integrally with the part 13A of the steering column, a second rotor consisting of a disc 23B rotating integrally with the part 13B of the steering column, and a second stator 24.

The first stator 22 possesses an annular feed groove 25 which is connected to an orifice 28 (FIG. 2) itself connected by a pipe 27 (FIG. 1) to the pump 18. The first stator 22 also possesses a return orifice 26 (FIG. 2) connected by a pipe 29 (FIG. 1) to the tank 17.

The rotor disc 23A possesses (FIG. 3) a circular series of communication passages 30 and two series of passages 31 and 32 for return to the tank 17. The rotor disc 23B possesses two concentric circular series of communication passages 33 and 34. The second stator 24 possesses (FIGS. 2 and 3) two concentric annular grooves 36 and 37 which are connected respectively to orifices 38 and 39 (FIG. 2). The orifices 38 and 39 are service orifices connected respectively by pipes 40 and 41 (FIG. 1) to the two sides of the jack 19.

Depending on the relative angular position of the two rotors 23A and 23B, one or other of the following operating conditions prevails:

The pressure orifice 28 is put in communication via the passages 30, 33, 34 with the service orifices 38 and 39 which are themselves connected to the orifices 31 and 32 for return to the tank 17, which corresponds to the neutral position of rest of the distributor 21, and in this case the power assistance is not involved;

the pressure orifice 28 is put in communication via the passages 30 and 33 with the service orifice 38, thus causing the power assistance to act on the jack 19 in one direction;

the pressure orifice 28 is put in communication via the passages 30 and 34 with the other service orifice 39, thus causing the power assistance to act on the jack 19 in the other direction.

Each of the parts 13A, 13B (FIGS. 2 and 4) has a central perforation 50 and 51 respectively. A torsion bar 52 couples the two parts 13A and 13B elastically. The torsion bar 52 has a main portion 53 and passes axially through the rotors 23A and 23B of the distributor 21 and extends freely with an annular play in the perforation 50, 51 of the parts 13A and 13B. The bar 52 also has two ends 54 and 55 which are fixed to the parts 13A and 13B respectively.

At least one of these ends, for example the end 54 in FIG. 2, is formed by a widened head 56 of the torsion bar 52. The torsion bar 52 has a fillet 57 between the main portion 53 and the widened head 56.

The widened head 56 of the torsion bar 52 is fixed to the part 13A by means of a pin 58.

The other end 55 of the torsion bar 52 is fixed to the part 13B either because it has a widened head fixed by means of a pin, like the end 54, or, as shown in FIG. 2, by means of a brazed joint 59 forming a sealing means between the end 55 and the part 13.

The ends of the two parts 13A and 13B facing one another have a widening of the perforations 50 and 51 to form two prism-shaped cavities 60 and 61 respectively.

Accommodated in these prism-shaped cavities 60 and 61 is a piece 62 which also has the form of a prism and which is engaged freely round the torsion bar 52.

The engagement of the piece 62 in the cavities 60 and 61 defines the limited relative angular play between the parts 13A and 13B. This play is a few degrees on either side of a mean neutral position of rest which tends to be restored and maintained by the torsion bar 52.

The angular keying of the ends 54 and 55 of the torsion bar 52 on the parts 13A and 13B is such that it ensures that the position of rest of the torsion bar 52 is made to coincide with the neutral position of the distributor 21.

It will be understood that the brazed joint 59 ensures not only the fixing of the end 55 of the bar 52 on the part 13B, but also the leak-tightness to the hydraulic fluid between the distributor and the outside environment.

At the other end 54 of the torsion bar 52, the widened head 56 fixed by the pin 58 to the part 13A ensures that this end 56 is mechanically firmly fixed to the part 13A, but it is necessary to provide an additional means to ensure leak-tightness to the hydraulic fluid between the distributor and the outside environment.

This additional means consists of an annular sealing gasket 70 engaged in the perforation 50 (FIGS. 2 and 4) round the main portion 53 of the torsion bar 52 and applied against the widened head 56. In the examples shown in FIG. 4, the gasket 70 is an O-ring and is designed to wedge itself in the fillet 57 made between the main portion 53 and the widened head 56 of the torsion bar 52.

The gasket 70 wedges itself automatically all the more and ensures a leak-tightness which is the more effective at the level of the fillet 57, the greater the pressure of the hydraulic fluid in the distributor 21 and the greater the risks of leakage.

The sealing gasket 70 can be provided alone, but washers 71 and 72 for maintaining axially in position can advantageously be associated with it. The washer 71 is, for example, a simple flat washer, whilst the washer 72 advantageously consists of an elastic washer shaped so as to interact as a buttress with the wall of the perforation 50, so as to keep the gasket 70 forcibly wedged at 57 under all circumstances.

In an alternative form, the annular sealing gasket consists (FIG. 5) of a lip gasket 70′, the lips of which may be seen at 73 and 74.

In another alternative form, the annular sealing gasket can be formed by a polymerisable sealing compound which is injected in situ.

In the absence of any action by the driver on the steering wheel 12, the parts 13A and 13B are maintained in the neutral position of rest by the torsion bar 52. The passages 30 and 33, 34 of the rotors 23A and 23B have a relative position such that the delivery of the pump 18 passes directly from the orifice 28 to the orifice 26. The system functions with an open center and the jack 19 is not stressed.

When the driver exerts action on the steering wheel 12 to change the direction of the wheels 16, the parts 13A and 13B are offset relative to one another in a specific direction, and the relative angular position of the two discs 23A and 23B passes from the neutral position of rest to a working position in which the passages 30 and 33, 34 cause the delivery of the pump 18 to pass from the orifice 28 to the corresponding surface orifice 38 or 39. In this way, the jack 19 acts in the desired steering direction.

In all cases, the sealing gasket, such as the gasket 70 of FIG. 4 or the gasket 70′ of FIG. 5, ensures perfect leak-tightness to the hydraulic fluid between the distributor 21 and the outside environment.

In the event of failure of the power-assistance means 17, 18, the effect of the turning action on the steering wheel 12 is to absorb the limited relative angular play between the parts 13A and 13B which is defined by the piece 62 in the cavities 60 and 61. The elastic resistance given by the torsion bar 52 is easily overcome, and then, as a result of the rigid connection made by the piece 62 between the parts 13A and 13B, the part 13B is driven to rotate integrally by the part 13A, thus permitting manual take-over by the control means 10 which then carry out turning directly.

The invention is not, of course, limited to the embodiments described and illustrated, but covers all alternative forms within the scope of the claims.

I claim:

1. Power-assisted steering device for a vehicle, comprising control means (10) acting on turning means (11) via a rotating transmission element (13), this element (13) being in two parts (13A and 13B) coupled elastically by a torsion bar (52), a limited relative angular play being provided between these two parts (13A, 13B) to permit an angular offset between said parts (13A, 13B) under the action of the control means (10) and against a restoring action of the torsion bar (52), and power-assistance means (17, 18) which, in response to such an angular offset, are allowed to act on the turning means (11) in the same direction as the control means (10), said power-assistance means comprising a hydraulic unit (17, 18), an actuator (19) acting on the turning means (11) and a distributor (12) located between the unit and the actuator, in which device said torsion bar (52) has, on the one hand, a main portion (53) which passes through the distributor (21) and extends freely in a perforation (50, 51) of said parts (13A, 13B) and, on the other hand, two ends (54, 55) which are fixed respectively to said parts (13A, 13B), at least one (54) of these ends being formed by a widened head (56) of said torsion bar (52), said device being characterized in that at least one annular sealing gasket (70, 70') is arranged round the main portion (53) of the torsion bar (52), being applied against said widened head (56) and engaged in said perforation (50), the torsion bar (52) having, between the main portion (53) and the widened head (56), a fillet (57) against which said annular sealing gasket (70, 70') wedges itself.

2. Device according to claim 1, characterised in that at least one washer (71, 72) for maintaining axially in position is associated with the annular sealing gasket (70).

3. Device according to claim 1, characterised in that the widened head (56) of the torsion bar (52) is fixed to the corresponding part (13A) of the rotating transmission element (13) by means of a pin (58).

4. Device according to claim 1, characterised in that the annular sealing gasket is an O-ring (70).

5. Device according to claim 1, characterised in that the annular sealing gasket is a lip gasket (70').

6. Device according to claim 1, characterised in that the annular sealing gasket is formed by a polymerisable sealing compound injected in situ.

* * * * *